Thoms & Miller,
Journal Box.
N° 36,682. Patented Oct. 14, 1862.
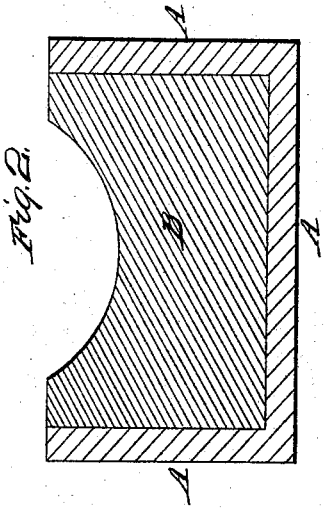
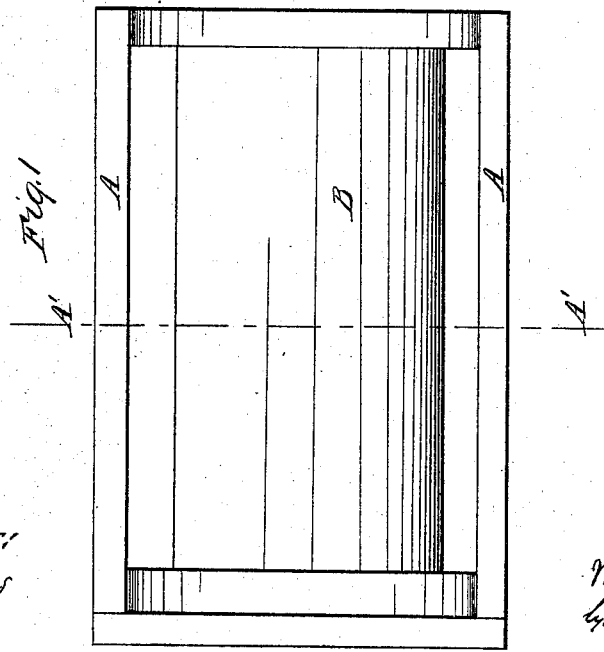

UNITED STATES PATENT OFFICE.

W. O. THOMS AND A. M. MILLER, OF FOND DU LAC, WISCONSIN.

IMPROVEMENT IN JOURNAL-BOXES.

Specification forming part of Letters Patent No. 36,682, dated October 14, 1862.

*To all whom it may concern:*

Be it known that we, W. O. THOMS and A. M. MILLER, of Fond du Lac, in the county of Fond du Lac and State of Wisconsin, have invented certain new and useful Improvements in Journal-Boxes for Machinery; and we do hereby declare the following to be a full, clear, and exact description of the same, reference being had to the annexed drawings, making part of this specification, in which—

Figure 1 is a top view of our journal-box, and Fig. 2 a transverse section taken on the line A' A' of Fig. 1.

Our invention consists of a new article of manufacture in the nature of a journal-box composed of metal and limestone.

We produce our journal-box by making the shell or outside thereof of metal, as shown by A, and filling it with limestone, as shown by B, and boring or otherwise cutting it out to fit the journal. This journal-box absorbs oil readily, heats slowly, and is very cheap and durable.

Journal-boxes have hitherto been lined with a great variety of substances—such as glass, alloys, and fibrous compositions; but we are not aware that limestone has ever before been used for this purpose.

What we claim, therefore, as our invention, and desire to secure by Letters Patent, is—

The new article of manufacture consisting of a journal-box composed of limestone and metal, as herein specified.

W. O. THOMS.
                      A. M. MILLER.

Witnesses:
    DE W. C. PRIEST,
    JOHN GILL.